(12) United States Patent
Ambrose et al.

(10) Patent No.: US 6,598,830 B1
(45) Date of Patent: Jul. 29, 2003

(54) TELESCOPING REFUELING PROBE

(75) Inventors: Michael H. Ambrose, Trumbull, CT (US); Anthony Zbigniew Stobiecki, Huntington, CT (US); Scott A. Chasen, Orange, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/171,003

(22) Filed: Jun. 12, 2002

(51) Int. Cl.$^7$ .............................................. B64D 39/00
(52) U.S. Cl. .................................................. 244/135 A
(58) Field of Search .......................... 244/1 TD, 135 A, 244/116

(56) References Cited

U.S. PATENT DOCUMENTS

| | | |
|---|---|---|
| 3,091,419 A | 5/1963 | Mosher |
| 3,476,140 A | 11/1969 | Jusyk |
| 3,703,998 A * | 11/1972 | Girard ........................ 244/13 |
| 4,025,193 A | 5/1977 | Pond et al. |
| 4,095,761 A | 6/1978 | Anderson et al. |
| 4,540,144 A | 9/1985 | Perrella |
| 4,646,794 A | 3/1987 | Padarev et al. |
| 4,693,286 A | 9/1987 | Lock et al. |
| 4,792,107 A * | 12/1988 | Fernz et al. ................ 244/115 |
| 4,981,272 A | 1/1991 | Cutore |
| 5,092,194 A | 3/1992 | Oliver et al. |
| 5,131,438 A | 7/1992 | Loucks |
| 5,393,015 A | 2/1995 | Piasecki |
| 5,810,292 A | 9/1998 | Garcia, Jr. et al. |
| 5,921,294 A | 7/1999 | Greenhalgh et al. |

* cited by examiner

*Primary Examiner*—Robert P. Swiatek
(74) *Attorney, Agent, or Firm*—Carlson, Gaskey & Olds

(57) ABSTRACT

A telescoping aerial refueling probe includes a second section and a ball screw. The first section is telescopically mounted to the second section. The ball screw is rotationally mounted along the longitudinal axis of the probe. A hydraulic motor rotates the ball screw to drive a ball screw nut and attached first section relative the second section. The hydraulic motor communicates with the hydraulic system and is operated in response to a control system. A backup motor such as an electric motor alternatively drives the ball screw upon failure of the hydraulic motor. As only the backup motor is required for redundancy, minimal additional weight is added to the probe and a relatively compact system is provided.

20 Claims, 4 Drawing Sheets

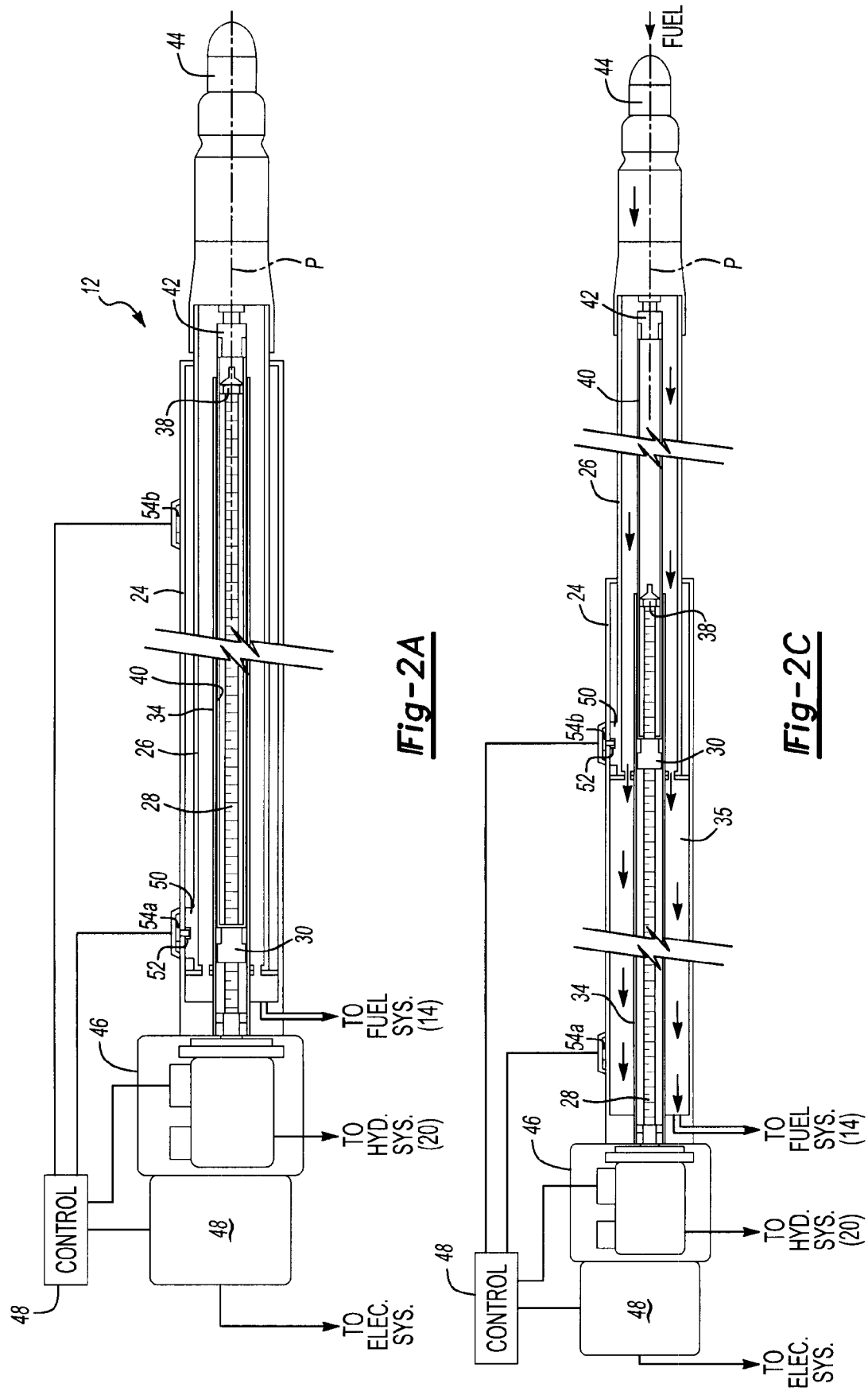

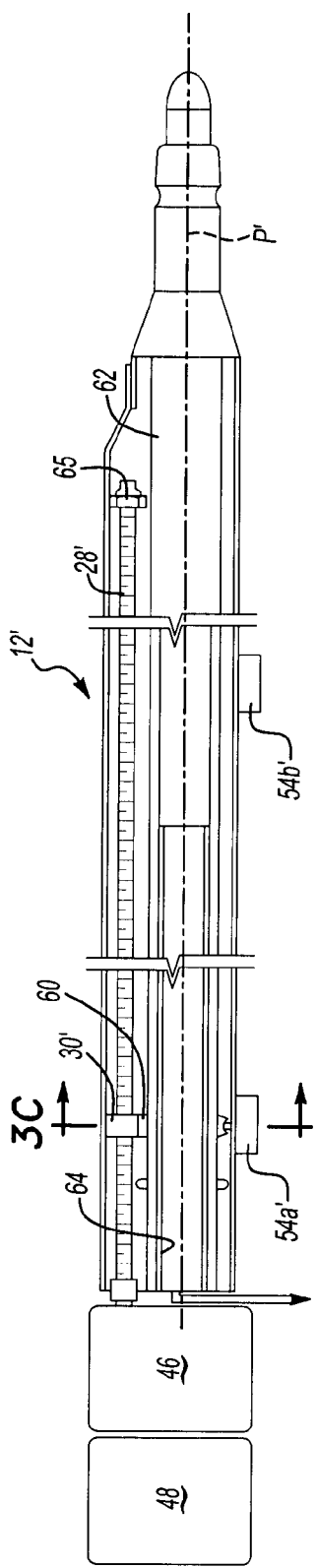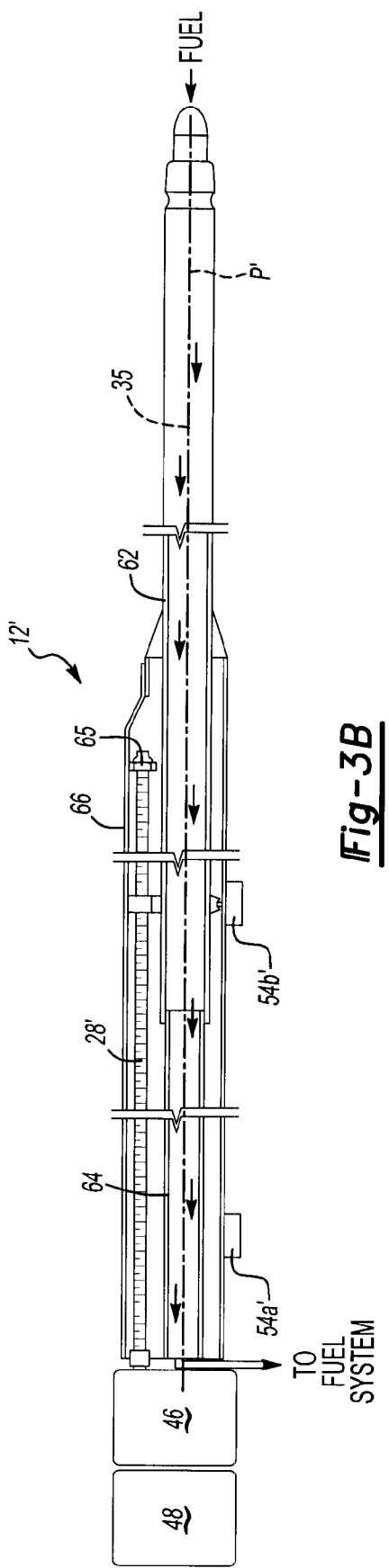

TELESCOPING REFUELING PROBE

BACKGROUND OF THE INVENTION

The present invention relates to a telescoping aerial refueling probe, and more particularly to a lightweight actuation system therefore.

Typically, telescoping aerial refueling probes are actuated pneumatically using engine bleed air. The hot bleed may dry out the probe's seals and cause corrosion of the telescoping sections which creates a stiction problem during extension and retraction. In addition, a relatively large quantity of bleed air is required to operate the probe within an acceptable time period. Usage of bleed air reduces the power available to the propulsion system.

Other telescoping aerial refueling probes are actuated hydraulically using fuel as the pressure medium. A first tube extends telescopingly from a second tube. Chambers are formed between the first tube and second tube to receive fuel. To extend the probe, an extension chamber is pressurized with fuel. Likewise, to retract the probe, a retraction chamber is pressurized with fuel and the extension chamber is connected to drain. Disadvantageously, the fuel-driven probe is relatively heavy as additional fuel lines, valves and specific high pressure pumps. Also, a quantity of fuel may always remain within multiple chambers of the probe. Trapped fuel is unusable to the propulsion system, increases system weight, and disadvantageously affects ballistic tolerance.

Due to the complexity and weight of both the pneumatic and fuel-driven systems, it has been difficult and weight-prohibitive to incorporate redundant actuation systems. Lack of redundant systems reduces the level of confidence in completion of long-range missions which do not provide the option of landing to refuel.

Accordingly, it is desirable to provide a refueling probe that is reliable, lightweight, and ballistically tolerant. It is further desirable that the probe include a redundant actuation system.

SUMMARY OF THE INVENTION

The aerial refueling probe according to the present invention includes an outer section, an inner section and a ball screw. The inner section is telescopically mounted within the outer section. The ball screw is rotationally mounted along a longitudinal axis of the outer section. A ball screw nut is mounted to a vehicle end of the inner section. The inner section has at an end opposite the vehicle end a valve such as a MIL-N-25161C Flexible Tip Nozzle.

A hydraulic motor rotates the ball screw to drive the ball screw nut and therefore the inner section relative the outer section. The hydraulic motor communicates with an aircraft hydraulic system and is operated in response to a control system. The probe includes three modes of probe operation: RETRACT, EXTEND, and REFUEL to selectively operate the hydraulic motor; and to transfer fuel into the fuel tank in the refuel mode.

A backup motor such as an electric motor operates to drive the ball screw upon failure of the hydraulic motor. Operation is essentially transparent from an operator perspective. As only the backup motor is required for redundancy, minimal additional weight is added to the probe and a relatively compact system is provided.

In operation, the pilot initiates the probe by selecting EXTEND which disengages a locking device and actuates the hydraulic motor. The hydraulic motor operates as a turbine, in which fluid rotates the hydraulic motor to rotate the ball-screw. Rotation of the ball screw drives a ball screw nut secured to the inner section. Translation of the nut drives the inner section relative the outer section. When the inner section contacts a limit switch stop or the like, the hydraulic motor stops and a locking device actuates to secure the inner section in the extended position. The probe is ready for aerial refueling. The procedure is essentially reversed for probe retraction.

The present invention therefore provides a refueling probe that is reliable, lightweight, ballistically tolerant and incorporates a redundant actuation system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is longitudinal sectional view of a fuel probe in a retracted position;

FIG. 2C is longitudinal sectional view of a fuel probe in an extended position;

FIG. 3A is longitudinal sectional view of another fuel probe according to the present invention in a retracted position;

FIG. 3B, is a sectional view of the fuel probe of FIG. 3A in an extended position.

DETAILED DESCRIPTION OF THE PREFERRED EMBODIMENT

Figure 1:
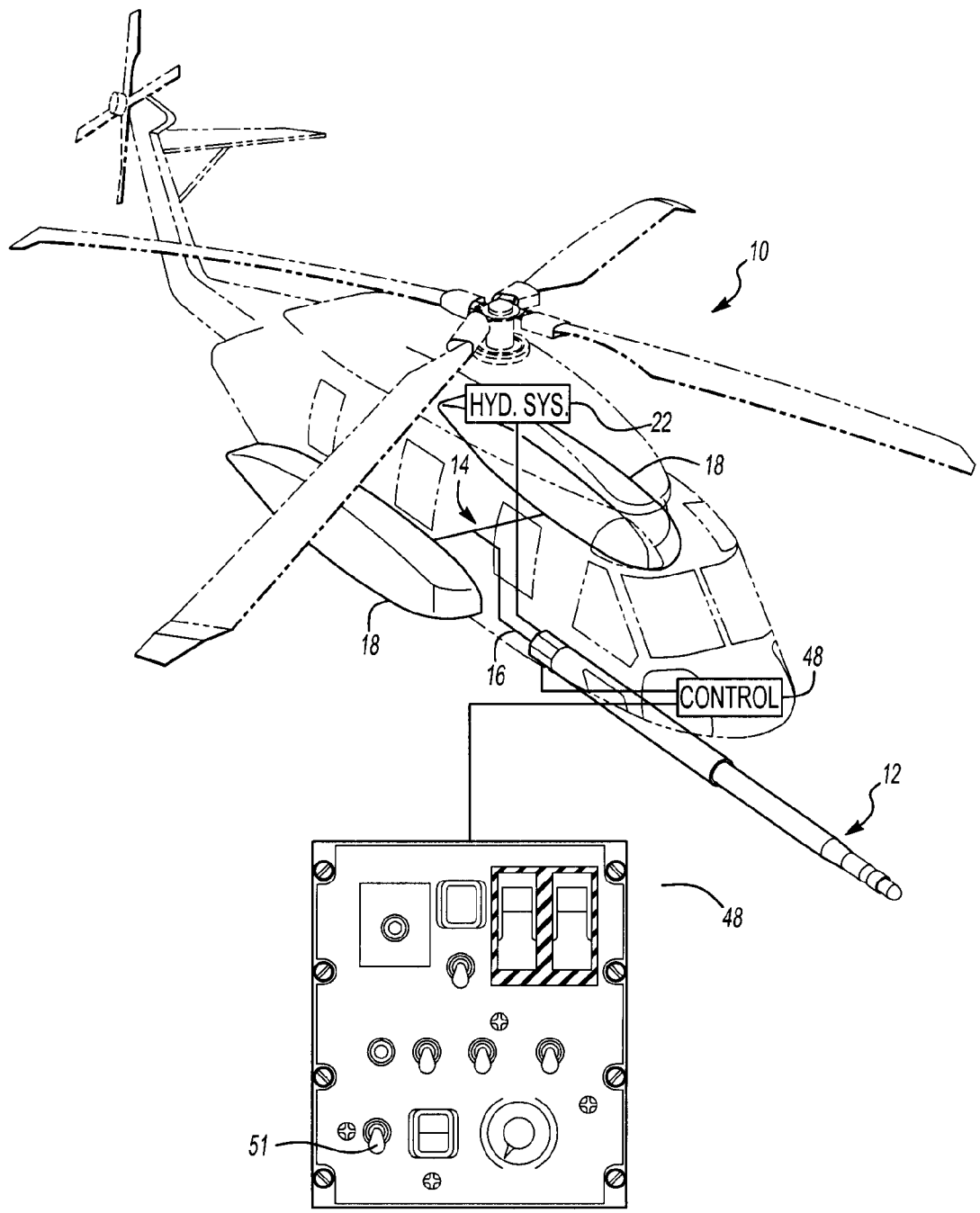
FIG. 1 Is a general perspective view an exemplary rotary wing aircraft embodiment for use with the present invention.

FIG. 1 illustrates a general perspective view of a vehicle 10 having a telescoping aerial refueling probe 12 according to the present invention. Although a particular vehicle is illustrated in the disclosed embodiment, it should be understood that many vehicles will benefit from the present invention. The probe 12 communicates with a vehicle fuel management control system 14 having fuel communication lines 16 and one or more tanks 18. The probe 12 also communicates with a hydraulic system 20. Preferably, the probe 12 receives hydraulic pressure the aircraft utility hydraulic system. It should be understood that although particular component arrangements and communication paths are disclosed in the illustrated embodiment, other arrangements will benefit from the instant invention.

Referring to FIG. 2A, a sectional view of the probe 12 is illustrated. The sectional view is defined vertically through a longitudinal axis P. The probe 12 includes an outer section 24 an inner section 26 and a ball screw 28. The longitudinal axis P is centrally located along the outer section 24 and the inner section 26. The inner section 26 is telescopically mounted within the outer section 24. It should be understood that various seals support bearings, bushings, sliding surfaces and the like which support the inner section 26 within the outer section 24 will benefit from the present invention. In furtherance of the well-accepted goal of reducing airframe weight, the inner and outer section is preferably of a filament wound, graphite/epoxy construction.

Preferably the inner section 26 provides a fuel volume equivalent to a fuel volume provided within the outer section 24. That is, fuel communicates between the inner and outer section to allow telescoping of the sections even when the aircraft fuel system is full of fuel. Moreover, as fuel communicates between the sections, fuel may be pumped or pneumatically displaced from within the probe even after probe retraction. That is, all fuel within the probe is usable. The probe will be dry as fuel from within the probe may be transferred from the probe to the tanks 18 (FIG. 1) once an equivalent volume is used from the filled tanks 18. Fuel may also be transferred when the probe is retracted which increases redundancy.

The ball screw 28 is rotationally mounted along axis P. Preferably, the ball screw 28 is mounted in a cantilever manner from the vehicle end of the probe 12. The ball screw 28 is longitudinally fixed within the outer section 24.

Figure 2B:
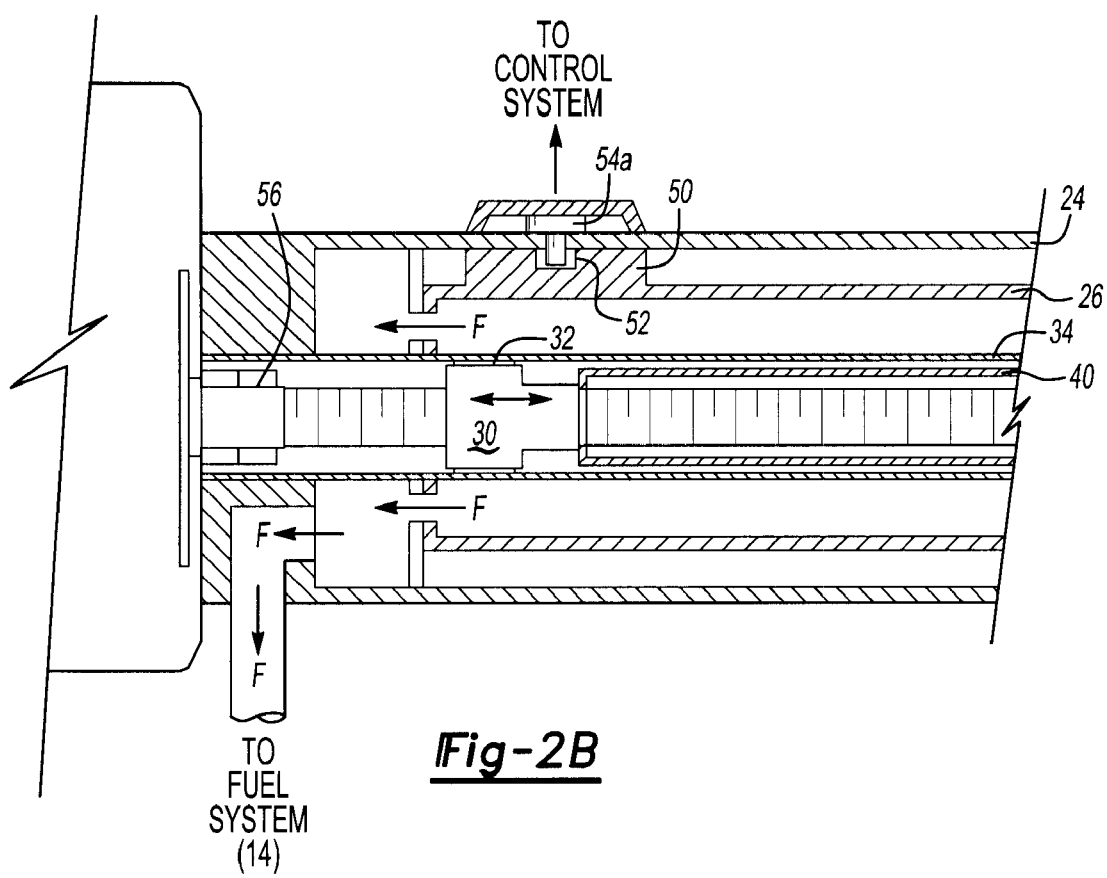
FIG. 2B is expanded view of a vehicle end of the fuel probe of FIG. 2A.

A ball screw nut 30 is mounted adjacent the vehicle end of the inner section 26. The ball screw nut 30 defines an outer periphery 32 (FIG. 2B) which closely fits within a fixed liner 34. The fixed liner 34 guides and supports the inner section 26 for longitudinal movement (FIG. 2B). The fixed liner 34 separates a fuel flow passage 35 (FIG. 2C) within the inner section 26 and outer section 24 from communicating with the ball screw 28. A mount 38 seals an outer end of the fixed liner 34 and a moveable inner liner 40. Mount 38 supports sliding of the movable inner liner 40 which telescopes within the fixed liner 34.

The movable inner liner 40 is connected to the inner section 26 by a mount 42. That is, the movable inner liner 40 axially drives the inner section 26 but need not rotate the inner section 26. The ball screw nut 30 is rotationally mounted to the movable inner liner 40. The movable inner liner 40 is therefore telescoped within the fixed liner 34 by axial movement of the ball screw nut 30.

It should be understood that either or both of nut 30 and mount 42 as well as inner housing 26 to outer housing 24 may incorporate indexing features to isolate the inner section 26 from rotation. It should be further understood that these components as well as the ball screw may be directly incorporated into the inner and outer sections, particularly, if the ball screw need not be isolated from fuel.

The inner section 26 has at an end opposite the vehicle end a valve 44, such as a MIL-N-25161C Flexible Tip Nozzle. The valve 44 permits fuel to flow into the fuel flow passage 35 in the direction indicated by arrows f. That is, fuel enters the probe 12 via the valve 44, but cannot exit therethrough.

A fluid driven motor such as a hydraulic motor (illustrated schematically at 46) rotates the ball screw 28 to drive the ball screw nut 30 and the movable inner liner 40. The movable inner liner 40 thereby drives the inner section 26 relative the outer section 24. The hydraulic motor 46 communicates with the hydraulic system 20 and is operated in response to a control system (illustrated schematically at 48; FIG. 1). The probe 12 preferably has three modes of operation: RETRACT, EXTEND, and REFUEL, which are selected by a switch 51 (FIG. 1) to selectively operate the hydraulic motor 38 to retract and extend the probe 12. Fuel is forced through the nozzle tip from pressure generated by the fueling tanker (i.e., no receiving vehicle pump is required).

The hydraulic motor 46 may receive hydraulic pressure tapped from the aircraft hydraulic system. By tapping an available fluid source the probe 12 of the present invention may be retrofitted to existing systems.

A backup motor (illustrated schematically at 48) such as an electric motor alternatively drives the ball screw 28 upon failure of the hydraulic motor 46. Preferably, operation is essentially transparent from an operator perspective. That is, upon failure of the hydraulic motor 46 of the hydraulic fluid feed to the hydraulic motor, the backup motor 48 becomes operational. A slightly longer actuation time, however, may result when the probe 12 is operated by the backup motor 48. As only the backup motor 48 is required to provide redundancy, minimal additional weight is added to the probe 12. Moreover, as the backup motor 48 is preferably mounted adjacent the hydraulic motor 46, a relatively compact system is provided by the present invention. Alternatively, or in addition, the hydraulic motor 46 includes a one-way freewheeling shaft splined to the backup motor 48.

To lock the probe 12 in an extended (FIG. 2C) and retracted (FIG. 2A) position, a locking collar 50 having a detent 52 is mounted to the inner section 26. In the fully retracted position the detent 52 aligns with a locking device 54a, such as a plunger solenoid. The locking device 54a is actuated in the fully retracted position to assure retention of the inner section 26. In the extended position, the detent 52 aligns with a second locking device 54b. The locking devices 54a, 54b preferably communicate with the control system 48 to automatically engage the inner section 26. It should be understood that stops (not shown) may be provided at the extended and retracted positions to assure proper end motion. Other locking devices and arrangements will also benefit from the present invention such as a single locking device with multiple detents upon the inner sections.

The probe 12 operates generally as follows. The pilot initiates the probe by selecting EXTEND which disengaging the locking device 54a and actuates the hydraulic motor 46. The hydraulic motor 46 operates as a turbine, in which fluid rotates the hydraulic motor 46 which rotates a motor shaft 56 (FIG. 2B). The motor shaft 56 rotates the ball-screw 28. Rotation of the ball screw 28 drives the ball screw nut 30 secured to the movable inner liner 40. Translation of the nut 30 and attached movable inner liner 40 drives the inner section 26 relative the outer section 24. When the inner section 26 contacts a limit switch stop or the like, the hydraulic motor 46 stops and the locking device 54b actuates to secure the inner section 26. The probe 12 is ready for aerial refueling. The procedure is essentially reversed for probe retraction.

Figure 3C:
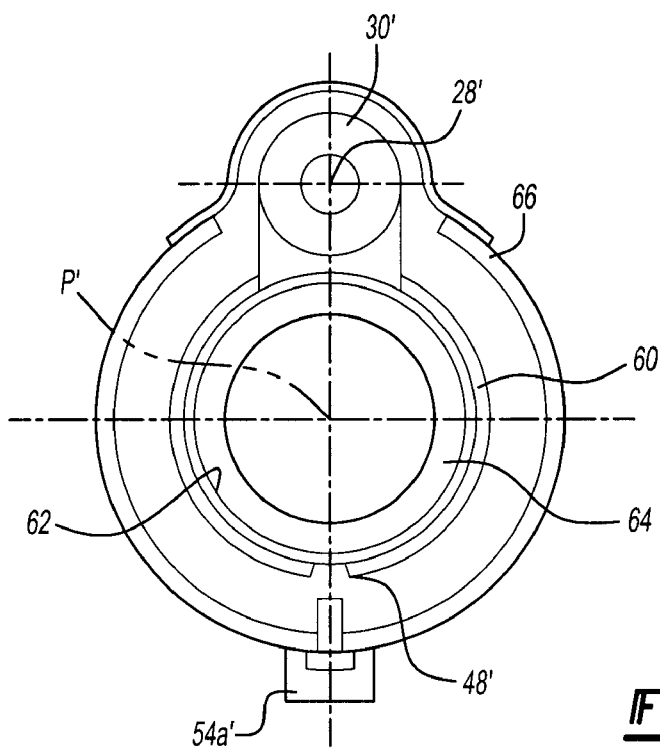
FIG. 3C is sectional view of the fuel probe of FIG. 3A taken along line 3C—3C.

Referring to FIG. 3A, another probe 12' is illustrated. Probe 12' operates similar to the above described probe 12. The ball screw 28' of probe 12, however, is located offset and parallel to a central axis P'. The ball screw nut 30' is integrated into a collar 60 mounted around an outer section 62 which telescopes over a fixed inner section 64. A locking detent 48' (FIG. 3C) is preferably located in the collar 60 to allow locking devices 54'a, 54'b to lock probe 12' in an extended (FIG. 3B) and retracted (FIG. 3A) position. A ball screw lock nut 65 is fixedly mounted to a housing 66 to provide rotation and support of the ball screw 28'. The ball screw 28' is thereby supported on the vehicle end by the hydraulic motor 46 and on a nozzle end by the ball screw lock nut 64. As the ball screw 28' is mounted offset from axis P', the housing 66 of probe 12' may be substantially non-cylindrical in cross-section (FIG. 3C).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A refueling probe comprising:

a first section; and a second section telescopically mounted to said first section, said second section movable relative to a ball screw;

a hydraulic motor which rotates, said ball screw; and a backup motor which rotates said ball screw.

2. The refueling probe as recited in claim 1, wherein said ball screw is mounted along a centerline of said first and second sections.

3. The refueling probe as recited in claim 1, wherein said first section and said second section are substantially tubular.

4. The refueling probe as recited in claim 1, wherein said second section defines a central axis, said ball screw mounted offset and parallel to said central axis.

5. The refueling probe as recited in claim 1, wherein said hydraulic motor communicates with a vehicle hydraulic system.

6. The refueling probe as recited in claim 1, wherein said backup motor comprises and an electric motor.

7. The refueling probe as recited in claim 1, further comprising a ball screw nut mounted to said second section, said ball screw nut movable along said ball screw.

8. The refueling probe as recited in claim 1, further comprising a ball screw lock nut mounted to said first section, said ball screw rotatable within said ball screw lock nut.

9. The refueling probe as recited in claim 1, further comprising a locking collar mounted to said second section.

10. The refueling probe as recited in claim 9, wherein said first section and said second section are mounted within a substantially non-tubular housing.

11. A telescopic aerial refueling probe comprising:

a first section;

a second section telescopically mounted to said first section;

a rotationally mounted ball screw; and a ball screw nut mounted to said second section, said ball screw nut movable along said ball screw to drive said second section relative to said first section.

12. The refueling probe as recited in claim 11, wherein said ball screw is rotationally mounted along a centerline of said first and said second section.

13. The refueling probe as recited in claim 11, wherein said first section and said second section define a central axis, said ball screw mounted offset and parallel to said central axis.

14. The refueling probe as recited in claim 11, further comprising a hydraulic motor and a backup motor, said backup motor operable to rotate said ball screw upon failure of said hydraulic motor.

15. The refueling probe as recited in claim 11, wherein said ball screw nut is mounted to a rear area of said second section.

16. The refueling probe as recited in claim 11, further comprising a movable inner section mounted to said second section, said ball screw nut mounted to said movable inner section to drive said second section relative to said first section.

17. The refueling probe as recited in claim 11, wherein said ball screw is isolated from a fuel flow passage.

18. A refueling probe comprising:

a first section; and a second section telescopically mounted to said first section, said second section movable relative to a ball screw, said second section defines a central axis, said ball screw mounted offset and parallel to said central axis.

19. A refueling probe comprising:

a first section;

a second section telescopically mounted to said first section, said second section movable relative to a ball screw; and a ball screw nut mounted to said second section, said ball screw nut movable along said ball screw.

20. A refueling probe comprising:

a first section;

a second section telescopically mounted to said first section, said second section movable relative to a ball screw, said first section and said second section mounted within a substantially non-tubular housing.

* * * * *

UNITED STATES PATENT AND TRADEMARK OFFICE
CERTIFICATE OF CORRECTION

PATENT NO.     : 6,598,830 B1
DATED          : July 29, 2003
INVENTOR(S)    : Michael H. Ambrose et al.

It is certified that error appears in the above-identified patent and that said Letters Patent is hereby corrected as shown below:

<u>Column 5,</u>
Line 13, should read as -- a hydraulic motor which rotates said ball screw; and --
Line 28, should read as -- backup motor comprises an electric motor. --

Signed and Sealed this

Sixteenth Day of December, 2003

JAMES E. ROGAN
*Director of the United States Patent and Trademark Office*